United States Patent Office 3,249,653
Patented May 3, 1966

3,249,653
UNSATURATED POLYESTERS PREPARED FROM GLYCIDYL ESTERS OF MIXED BRANCHED MONOCARBOXYLIC ACIDS
Gerrit J. van Amerongen and Nantko Kloos, Amsterdam, Netherlands, assignors to Shell Oil Company, New York, N.Y., a corporation of Delaware
No Drawing. Filed Feb. 18, 1963, Ser. No. 259,411
Claims priority, application Netherlands, Feb. 27, 1962, 275,326
5 Claims. (Cl. 260—861)

This invention relates to a process for the preparation of unsaturated polyester polymers. More particularly, the invention provides a process for preparing polyester resins which have excellent chemical resistance and wide application.

Specifically, the invention provides a process for the preparation of polyester polymers and copolymers which not only have unexpectedly high chemical resistance but also have valuable and wide applications discussed more thoroughly hereinafter which comprises mixing and reacting an unsaturated polyester (alkyd) prepared by reacting polybasic carboxylic acids and/or anhydrides, polyhydric alcohols and alpha-branched saturated aliphatic monocarboxylic acids or their epoxy alkyl esters with another copolymerizable compound.

It has been found that the polyesters prepared according to the process of the present invention are unexpectedly resistant to chemicals, particularly sodium hydroxide and acetic acid.

It has also been found that these novel polyester resins are particularly suitable in the manufacture of a wide range of articles and materials. A few of the many such uses with the corresponding advantages will be discussed briefly. They are particularly suitable for use as solventless lacquers for wood, especially in the furniture industry. The outstanding advantage of such lacquers is that with a single application a much thicker coating may be obtained than can be obtained from the usual lacquer base materials dissolved in solvents. Moreover, the mechanical and chemical stability of such lacquer coatings is considerably greater.

These novel polyester polymers are also very suitable in the manufacture of castings wherein the polymerizable mixture is simply poured into a mold of the desired shape and then allowed to cure in the mold at room temperature, or higher, as desired. This technique has distinct advantages because castings can be formed without the application of pressure.

These polyesters may be very suitably employed in the manufacture of laminated products such as binding layers of paper, cardboard, fabric, glass fibers, metal or the like with layers of the resin. Similarly, the polyesters may be used to manufacture flooring as by mixing the polyester with inorganic fillers, such as sand, stone dust, stone chippings, and the like. A very suitable composition for such purpose was found to be about 20 parts of resin and 80 parts filler. The resin alone may be used as an effective coating material for wood, metal, concrete and the like. The applied coating was found to be not only virtually impermeable to water and other liquids but was also found to exhibit a high resistance to chemicals.

The unsaturated polyesters derived by reacting polybasic carboxylic acids and/or anhydrides, polyhydric alcohols and alpha-branched saturated aliphatic monocarboxylic acids and/or epoxy alkyl esters of said alpha-branched acids may be prepared in many ways such as those described in copending application by Nantko Kloos, Serial No. 151,150, filed November 9, 1961. The polybasic carboxylic acids may be unsaturated, as, for example, maleic acid.

The usual method for preparing the unsaturated polyesters is simply to react the polybasic carboxylic acid, the polyhydric alcohol and the monocarboxylic acids or epoxy alkyl esters thereof at a temperature between about 130° and 270° C.

The polyester formation reaction is generally performed at temperatures between 130° and 270° C.; however, during a stage in which water is formed, a temperature between 190° and 250° C. is preferably maintained. Thus, one may react phthalic anhydride, glycol and epoxy alkyl esters of alpha-branched saturated aliphatic monocarboxylic acids first at 150° C., at which temperature mainly epoxy groups and anhydride groups react, and then raise the temperature to about 190° to 230° C., which causes the reaction to continue with the formation of water.

An organic solvent, as for example, xylene, may be added to the reaction mixture. The water formed is then easily removed together with the xylene by azeotropic distillation.

A very satisfactory procedure is as follows:

The mixture of polybasic carboxylic acids and/or their anhydrides and polyhydric alcohols is heated to about 100° C. after which the reaction starts with generation of heat. After 20 to 30 minutes the epoxy alkyl esters of the alpha-branched saturated aliphatic monocarboxylic acids are added. The reaction mixture is kept at an elevated temperature for some time while the water formed in the process is distilled off.

In general, the reaction temperature which has to be maintained may vary from 150 to 250° C. The duration of the treatment according to the invention is often dependent on various factors. In general, the time needed may vary from 30 minutes to 5 hours. However, a shorter or longer treatment time is not excluded.

In these unsaturated polyesters the unsaturated carbon-to-carbon linkages need not necessarily always be present in the parts of the molecule originating from the polybasic carboxylic acids or anhydrides. Unsaturated linkages may also occur as a result of the reaction of unsaturated polyhydric alcohols, as for example butenediol, during the formation of the polyesters. The unsaturation of the polyester molecule may also be wholly or partly derived from the unsaturated carbon-to-carbon linkages in the monocarboxylic acids used. These unsaturated bonds may have been present in the monocarboxylic acids in which the carboxyl groups are attached to tertiary and/or quaternary carbon atoms, but these unsaturated bonds may also be derived from other monocarboxylic acids than those just mentioned, for example, from the fatty acids from linseed oil. Finally, the unsaturation of the polyesters may wholly or partly arise as a result of the reaction, during the formation of the polyesters, of unsaturated monohydric alcohols, as for example allyl alcohol.

In most cases the unsaturated bonds between carbon atoms in the unsaturated polyesters are double bonds, but they can also be triple, as in acetylene.

In the preparation of the unsaturated polyesters either the polybasic carboxylic acids and/or anhydrides may be employed. Suitable such polybasic carboxylic compounds include, among others, maleic acid, maleic anhydride, citraconic acid, citraconic anhydride, itaconic acid, itaconic anhydride, tetrahydrophthalic acid, tetrahydrophthalic anhydride, fumaric acid and mesaconic acid. Diels-Alder adducts of maleic anhydride with various dienes such as terpenes and cyclopentadienes are also very suitable. If the polymerizable unsaturated bonds are incorporated in the polyester molecule by means of polyhydric alcohols and/or monocarboxylic acids, then saturated and/or aromatic polybasic carboxylic acids and their anhydrides may also be employed. Examples of these acids are: malonic acid, succinic acid, glutaric acid, adipic acid, azelaic acid, sebacic acid, phthalic acid, hexahydrophthalic acid, isophthalic acid, terephthalic acid, diglycolic acid and dimerized fatty acids of drying oils such as soya oil. Examples of suitable anhydrides of saturated or aromatic polybasic carboxylic acids are those of succinic acid, glutaric acid, phthalic acid and hexahydrophthalic acid. Polybasic carboxylic acids and/or their anhydride with one or more polymerizable unsaturated bonds may be used in the formation of the unsaturated polyesters also in conjunction with polybasic carboxylic acids and/or their anhydrides without such bonds.

Unsaturated monocarboxylic acids may also be employed. Suitable unsaturated monocarboxylic acids include, among others, the fatty acids from drying oils such as linseed oil, China-wood oil, soya oil, fish oil, cottonseed oil, oiticica oil, perilla oil, sunflower oil, dehydrated fatty acids from castor oil, and fatty acids from tall oil. Other suitable unsaturated monocarboxylic acids are, for example, acrylic acid and methacrylic acid. These acids are reacted with the other resin components preferably in the form of esters with polyols, such as glycerides, for example monoglycerides or diglycerides ore else triglycerides or in the form of epoxy alkyl esters such as glycidyl esters.

Of the polyhydric alcohols which may serve as base materials in the preparation of unsaturated polyesters the following may be mentioned: glycol, diethylene glycol, triethylene glycol, 1,2-propanediol, 1,3-propanediol, 1-2-butanediol, 1,3-butanediol, 2,3-butanediol, 1,4-butanediol and 1,4-butenediol. The alcohols given above may be used either separately or together. Monohydric alcohols, as for example allyl alcohol, and/or trihydric or polyhydric alcohols, as for example glycerol, trimethylolpropane and pentaerythritol, may be included in the reaction mixture.

Particularly preferred are the aliphatic and cycloaliphatic polyvalent hydroxy compounds or alcohols having from about 2 to about 12 carbon atoms per molecule.

The saturated aliphatic monocarboxylic acids whose carboxyl groups are attached to tertiary and/or quaternary carbon atoms will also be referred to herein as branched or alpha-branched monocarboxylic acids.

As saturated aliphatic monocarboxylic acids in which the carboxyl groups are attached to tertiary and/or quaternary carbon atoms, use may well be made of those monocarboxylic acids which are obtained by the reaction of formic acid or of carbon monoxide and water with olefins under the influence of liquid acid catalysts, such as sulfuric acid, phosphoric acid or complex compounds of phosphoric acid, boron trifluoride and water. Monocarboxylic acids of this type can also be prepared by the reaction of formic acid or of carbon monoxide and water with paraffins under the influence of the same catalysts referred to above if at the same time hydrogen acceptors are present. Olefins and compounds from which olefins are easily formed, such as alcohols and alkyl halides, may serve as hydrogen acceptors. By the method specified above mixtures of saturated aliphatic monocarboxylic acids are usually obtained which are branched in the alpha position; a considerable part of these mixtures consists of acids in which the carboxyl group is attached to a quaternary carbon atom. Suitable monocarboxylic acids branched in the alpha position can also be obtained by Reppe's method. As starting materials mixtures of olefins are preferably used which have been obtained by cracking paraffinic hydrocarbons, for example, heavy petroleum fractions, solid paraffins and high-boiling fractions of products from the cracking of petroleum fractions. These olefin mixtures contain a large proportion of unbranched acyclic olefins alongside branched olefins. In certain cases cycloaliphatic olefins may also be present. The action of formic acid or of carbon monoxide and water on these olefins mixtures yields mixtures of saturated acyclic monocarboxylic acids in which cycloaliphatic monocarboxylic acids may also be present.

The preferred alpha-branched saturated aliphatic monocarboxylic acids suitable for use in the present invention may be represented by the general formula:

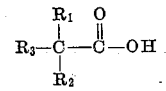

wherein $R_1$ and $R_2$ each rpresent the same or different alkyl radicals of normal, branched or cyclic structure and $R_3$ represents hydrogen or a hydrocarbyl radical. In the foregoing formula $R_1$ and $R_2$ each may represent a member of the group consisting, for example, of methyl, ethyl, propyl, butyl, pentyl, octyl, decyl, and the like, radicals. Hydrocarbyl radicals may comprise, for example, alkyl radicals of normal, branched or cyclic structure including methyl, ethyl, propyl, butyl, pentyl, hexyl, octyl, as well as alkaryl, aralkyl and aryl radicals.

Suitable such monocarboxylic acids are those having from 4 to about 20 carbon atoms in the molecule with from about 8 to about 20 being especially preferred.

For the preparation of the unsaturated polyesters it is preferable to use epoxy alkyl esters of the said branched monocarboxylic acids. In particular, glycidyl esters are to be preferred. The said branched monocarboxylic acids may be converted into epoxy alkyl esters according to the methods described in copending patent application by Nantko Kloos and Jacques J. J. Droost, Serial No. 28,865, filed May 13, 1960, now U.S. 3,178,454, issued April 13, 1965.

Excellent results may be obtained if use is made of epoxy alkyl esters of mixtures of monocarboxylic acids branched in the alpha position, as described above, containing, for example, 9 to 11 or else 15 to 19 carbon atoms per molecule; epoxy alkyl esters from other monocarboxylic acids branched in the alpha position or mixtures thereof are, however, also very suitable.

Briefly speaking, the preparation of the epoxy alkyl esters may be simply prepared by reacting an acid salt of the monocarboxylic acids (for example, alkali metal salts or quaternary ammonium salt) with epichlorohydrin. This reaction is preferably carried out by gradually adding a liquid phase consisting of epichlorohydrin or containing the latter in a stream of a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The polymerizable compounds which are suitable for copolymerizing with the above-described unsaturated polyesters are those having a =C=C= group and particularly a $CH_2=C=$ terminal group, i.e., a vinylidene group. Included in this class of compounds are the aryl olefins such as styrene, substituted styrenes as alpha-methylstyrene, chlorostyrenes, hydroxystyrenes, alkoxystyrenes, vinyltoluenes and the like; vinyl compounds, such as vinyl chloride, vinyl acetate, acrylic acid, ethyl acrylate, acrylonitrile, methacrylonitrile, and the like; allyl compounds, such as allyl acrylate, allyl methacrylate, allyl crotonate, diallyl succinate, diallyl adipate, diallyl maleate and diallyl phthalate; and cycloalkenes such as cyclohexene and cyclopentadiene.

Styrene is a preferred monomer because of its cost, availability and excellent results obtained.

The ratio of unsaturated polyester to the other polymerizable compound may be varied considerably. In general very good results have been obtained by copolymerization of unsaturated polyesters with other polymerizable compounds in the weight ratios between 90:10 and 20:80.

The resins can be cured by treatment with the usual catalysts and accelerators. Examples of suitable catalysts are organic peroxides such as ditert-butyl peroxide, benzoyl peroxide, cyclohexanone peroxide and methyl ethyl ketone peroxide. Use of such catalysts makes it possible for the resins to be cured at a comparatively low temperature. The addition of suitable accelerators or activators increases in particular the speed of cure. Examples of suitable accelerators are certain amines, such as dimethylaniline, diethylaniline, di-n-propylaniline, or metallic salts such as cobalt naphthenate and cobalt octoate. The catalysts are mostly used in quantities of between 0.1 and 5 percent by weight calculated on the total mixture, and the accelerators generally in quantities of from 0.01 to 5 percent by weight. As a rule the temperature during copolymerization is between 0 and 100° C. Ambient temperatures are often sufficient.

The invention is illustrated by the following examples. The reactants, and their proportions, and other specific ingredients are presented as being typical and various modifications can be made in view of the foregoing disclosure, without departing from the spirit or scope of the disclosure or of the claims.

The parts recited in the examples are by weight unless otherwise designated.

The alpha-branched monocarboxylic acids ($C_9$–$C_{11}$) used in the examples were obtained by the reaction of cracked olefins containing 8 to 10 carbon atoms per molecule with carbon monoxide and water in the presence of a catalyst composed of phosphoric acid, boron trifluoride and water. They contained 9 to 11 carbon atoms per molecule and the carboxyl groups were attached to tertiary and/or quaternary carbon atoms. The sodium salts thereof were converted into the glycidyl esters by treatment with epichlorohydrin.

*Example I*

A. A mixture of 98.0 parts (1.0 mole) maleic anhydride and 22.8 parts (0.3 mole) 1,2-propanediol was heated to 100° C. at which temperature the reaction started with generation of heat. As a result of this generation of heat temperature rose to 180° C. within 20 minutes. After the addition of 187.2 parts (0.8 mole) glycidyl esters of branched monocarboxylic acids ($C_9$–$C_{11}$) the temperature was maintained at 210–215° C. for 1 hour while the water formed in the process was distilled off. The polyester had an acid value of 18. It was a very light-colored semi-solid mass which became pourable between 50–60° C.

60 parts polyester were copolymerized with 40 parts styrene in the presence of 2 parts of cyclohexanone peroxide with 10% water and 0.5 part cobalt naphthenate at room temperature.

B. A mixture of 49.0 parts (0.5 mole) maleic anhydride, 74.0 parts (0.5 mole) phthalic anhydride and 68.4 parts (0.9 mole) 1,2-propanediol was heated in the same way as the mixture of maleic anhydride and 1,2-propanediol in section A. After the addition of 70.2 parts (0.3 mole) glycidyl esters of branched monocarboxylic acids ($C_9$–$C_{11}$), the temperature was maintained at 210–215° C. for 1 hour while the water formed in the process was distilled off. The polyester, which had an acid value of 25, was copolymerized with styrene in the same way as the polyester in section A.

The properties of the resin obtained according to sections A and B were investigated. The results were summarized in the following table. The Vicat-softening temperature is valid for a penetration of 0.1 mm. To evalute the chemical resistance, the precent weight increase after immersion for 20 days in various liquids was determined.

| | Vicat softening temperature, ° C. | Weight increase in percent after 20 days' exposure to— | | | |
|---|---|---|---|---|---|
| | | 20% NaOH | 2% NaOH | 5% acetic acid | Water |
| Resin A | 41.5 | 1.2 | 0.3 | 0.9 | 0.75 |
| Resin B | 47 | −0.2 | 1.05 | 1.25 | 1.25 |

*Example II*

A mixture of 74.0 parts of phthalic anhydride, 56.0 parts of itaconic anhydride and 27.0 parts of 1,4-butanediol is heated at 100° C. and within about 30 minutes due to generated heat the temperature is about 180° C. Then 187.2 parts of glycidyl esters of alpha-branched monocarboxylic acids ($C_9$–$C_{11}$) are added and the temperature maintained at 210°–215° C. for 1 hour with the water formed in the process being distilled off. Sixty parts of this polyester having a light, semi-solid appearance and an acid value of 20 is copolymerized with 40 parts of styrene in the presence of 2 parts of cyclohexanone peroxide (10% water) and 0.5 part cobalt naphthenate at room temperature. The resulting polymer has excellent chemical resistance, particularly to acetic acid and sodium hydroxide.

*Example III*

The procedure of Example II is substantially repeated wherein the styrene is replaced with an equivalent amount of methylmethacrylate, p-vinyltoluene and beta-vinylnaphthalene. A similar polymer having similar chemical resistance is obtained in each instance.

*Example IV*

Twenty parts of a resin obtained in Example I as Polyester A is mixed with 80 parts of a 40 mesh sand and applied to concrete. A coating is obtained which has non-skid features as well as excellent water and chemical resistance.

*Example V*

The procedure of Example I is essentially repeated wherein a mixture of alpha-branched saturated aliphatic monocarboxylic acids containing from 9 to 11 carbon atoms per molecule with an equivalent amount of glycerol is used in lieu of the glycidyl esters of said alpha-branched monocarboxylic acids. The resulting polyester resin has substantially as high as chemical resistance as the polyesters prepared from the glycidyl esters of these acids.

We claim as our invention:

1. A process for preparing unsaturated polyester polymers which comprises mixing and reacting (A) an unsaturated polyester prepared by effecting a polycondensation reaction of (1) an unsaturated polybasic compound selected from the group consisting of polybasic carboxylic acids and polybasic carboxylic anhydrides, (2) polyhydric alcohols and (3) glycidyl esters of mixed alpha-branched saturated aliphatic monocarboxylic acids prepared by reacting said acids with epichlorohydrin, and wherein said acids contain from 4 to 20 carbon atoms and are prepared by reacting olefins with carbon monoxide and water in the presence of acidic catalysts with (B) another copolymerizable compound having a vinyl group.

2. A process as in claim 1 wherein the monocarboxylic acids contain from 9 to 11 carbon atoms.

3. A process as in claim 1 wherein the polyhydric alcohol is 1,2-propanediol.

4. A process as in claim 1 wherein the copolymerizable compound is styrene.

5. An unsaturated polyester polymer prepared by a process which comprises mixing and reacting (A) a polyester prepared by effecting a polycondensation reaction of (1) an unsaturated polybasic carboxylic anhydride, (2) a polyhydric alcohol having from 2 to 12 carbon atoms in the molecule and (3) glycidyl esters of mixed saturated aliphatic alpha-branched monocarboxylic acids prepared by reacting said acids with epichlorohydrin, and wherein said acids contain from 4 to 20 carbon atoms and are prepared by reacting olefins with carbon monoxide and water in the presence of acidic catalysts with (B) styrene.

References Cited by the Examiner
UNITED STATES PATENTS

| 2,521,575 | 9/1950 | Fisk | 260—861 |
| 2,966,479 | 12/1960 | Fischer | 260—78.4 |
| 3,039,979 | 6/1962 | Carlick et al. | 260—76 |
| 3,064,040 | 1/1962 | Klemchuk | 260—413 |

MURRAY TILLMAN, *Primary Examiner.*

J. T. GOOLKASIAN, *Assistant Examiner.*